Patented Dec. 29, 1936

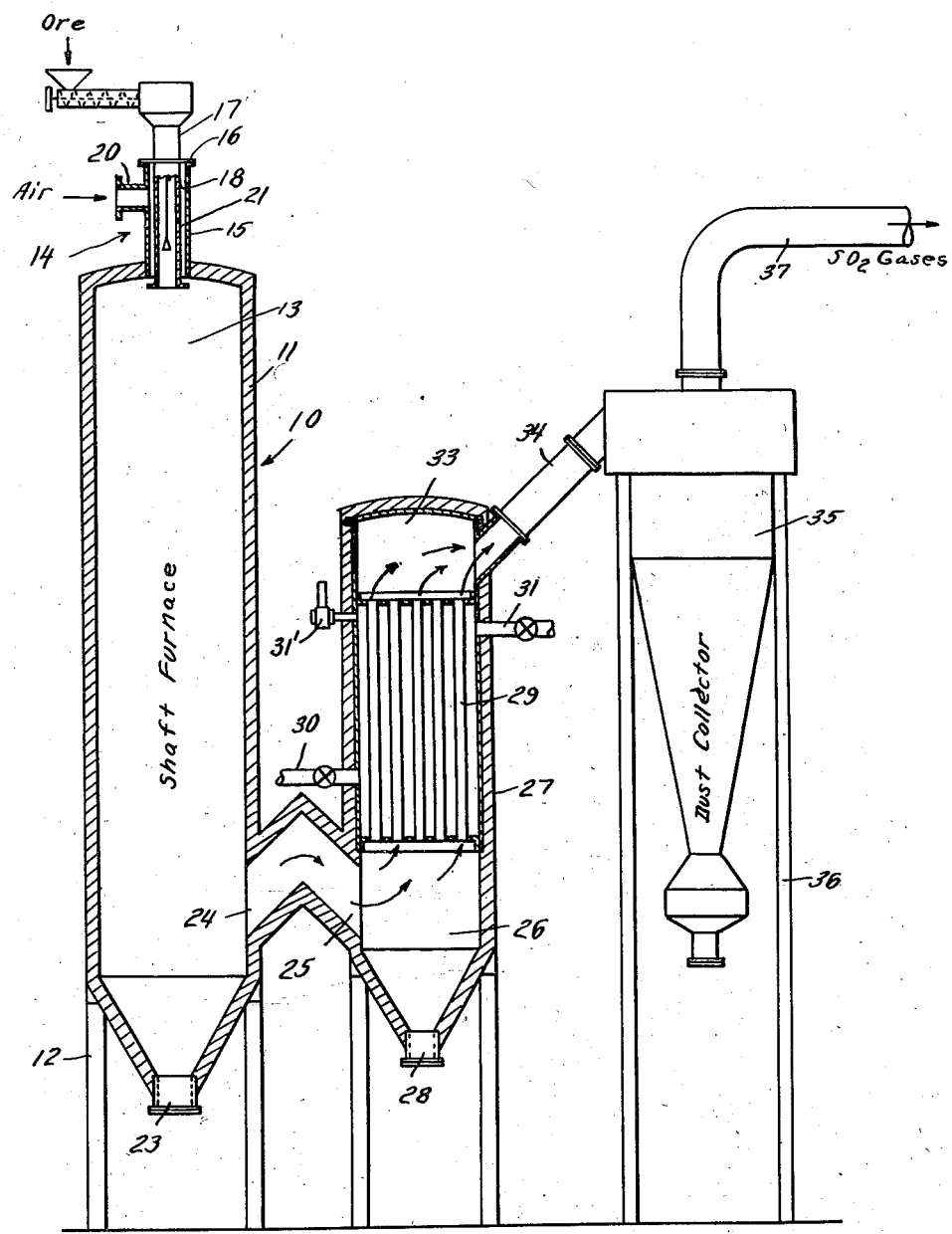

2,065,563

UNITED STATES PATENT OFFICE 2,065,563

ROASTING ORE

Bernard M. Carter, Montclair, and Henry F. Merriam, West Orange, N. J., assignors to General Chemical Company, a corporation of New York Application January 6, 1932, Serial No. 584,950

4 Claims. (Cl. 266—17)

This invention relates to roasting ores, and is more particularly directed to suspension roasting of finely divided sulfide ores, such as flotation concentrates.

Sulfur dioxide gases have been produced from sulfide ores, particularly pyrites, flotation concentrates and the like, by burning in a shaft furnace the finely divided sulfides while suspended in an oxidizing gas. Such roasting operation is disclosed, for example, in U. S. Patent No. 1,758,188, granted May 13, 1930 to Cordy et al. In the method described in that patent, finely divided sulfide ores and air are introduced into the top of the roasting chamber, and the roasted cinder and gaseous products of combustion withdrawn from the lower end of the furnace. Sulfur dioxide gases produced in this manner may be used in the manufacture of sulfuric acid, the paper making industry, or in any other desirable manner.

Because of the nature of suspension roasting of sulfides, the sulfur dioxide gases produced thereby contain appreciable quantities of dust consisting largely of metallic oxides, for example iron oxide, when the source of the sulfur is iron sulfide. Such dust must necessarily be removed from the gas stream before the gases are utilized for making sulfuric acid or paper pulp, or for other purposes. To effect removal of dust from the gas stream, various constructions and arrangements of dust chambers in the gas line have been proposed. For instance as shown in the Cordy et al patent, the exit gases from the roasting furnace are passed into a large dust chamber, constructed of brick or other refractory material, disposed immediately adjacent the outlet of the roasting chamber. Such construction and arrangement is customary in the art. Refractory material has been employed on account of the high temperatures necessarily involved, and the dust chambers have been of large dimensions because of the large volume of highly heated gases from which the dust must be removed. Such dust chambers might, of course, be constructed of metal, but have not been so made because of the necessity of using some expensive alloy to withstand the corrosive effects of sulfur dioxide gases at high temperature, and further because of the large size chamber required to handle the volume of gas. To our knowledge, dust chambers of whatever construction, have been arranged in the gas line immediately following the outlet of the roasting chamber.

According to the present invention, substantial advantages and economies in suspension roasting methods may be effected by immediately reducing the temperature of the exit gases from the roaster below that at which the sulfur dioxide gases are injurious to ordinary sheet iron or steel, and then removing the dust from the gas stream by passing the same through a small dust separator constructed of the usual grade of iron or steel. Hence, the invention contemplates a roasting operation involving a shaft roaster for roasting ores in suspension, and a heat exchange device, preferably a waste heat boiler, connected to the outlet of the roasting chamber, the heat exchange device being so constructed and proportioned as to quickly reduce the temperature of the hot roaster gases to such an extent that the gases will not corrode steel or iron. When the temperature of the gases is so reduced, entrained dust is subsequently removed from the gas stream by means of separators constructed of comparatively inexpensive metal.

The operating advantages arising from the invention are well defined and facilitate substantial reduction in both capital investment and maintenance costs. Initially, the large quantity of excess heat developed in the roasting reaction is extracted from the gas stream in the waste heat boiler, and the steam thus generated utilized in the plant as needed. This item alone is basis for a substantial reduction in maintenance. Since the temperature of the sulfur dioxide gases is greatly reduced, to a degree hereinafter noted, the corrosive effect thereof on the metallic parts of the boiler itself and on the connecting flues is largely overcome, and the useful life of these elements increased. One of the most important advantages of the reduction in temperature of the gases bears directly on the size of the subsequent dust collector and the nature of the material from which it may be constructed. Since the temperature of the gas stream is greatly reduced, the volume of gases is correspondingly decreased, and hence the size of the dust collector may be materially decreased. Because of the low temperature of the gases, ordinary sheet steel or iron, rather than special alloy such as chrome steel, may be utilized in the construction of the separator. Accordingly, the cost of the dust separator is reduced with respect to both size and as to the material from which it is made.

A more detailed understanding of the nature and objects of the invention, and the advantages arising therefrom, may be had from a consideration of the following description taken in connection with the accompanying drawing which illustrates, partly in section and and partly in elevation, apparatus constituting one embodiment of the present invention.

Referring to the drawing, the shaft furnace 10 comprises a vertically elongated, preferably cylindrical shell 11, constructed of refractory material, and supported by framework 12. Finely divided sulfide ore suspended in air or other oxidizing gas is fed into the upper end of the roasting chamber 13 by means of feed mechanism shown diagrammatically in the drawing and indicated generally by the reference numeral 14. The ore feeding device may include an upwardly projecting, cylindrical casing 15, having the lower end thereof set into the crown of the furnace, and the upper end closed off by a plate 16 provided with a circular opening to accommodate an ore inlet conduit 17. The diameter of conduit 17 is considerably less than that of casing 15 so as to form an annular air chamber 18 between the outer surface of the conduit and the inner surface of casing 15. Finely divided ore may be continuously fed into the conduit 17 by any suitable means not shown. Air serving to effect a suspension of the ore, and to support combustion in the roasting chamber is introduced into the feed mechanism through the inlet 20. The ore conduit 17 may be provided with a series of openings 21 to permit admission of air from the annular chamber 18 into the interior of the ore conduit to bring about a suspension of ore in air. The particular feed mechanism illustrated constitutes no part of the present invention. Accordingly, any desirable means for forming a suspension of finely divided sulfide ore in an oxidizing gas and introducing a suspension into the upper end of the roasting chamber may be employed. Mechanism fully adapted for this purpose is fully described in the above mentioned patent to Cordy et al.

The lower end of the roasting chamber is funnel-shaped, and is provided at the bottom with a suitable device 23 for removing cinder from the roasting chamber at any desired rate. The gas outlet 24, also located at the lower end of the roasting chamber, communicates through a conduit 25 with the inlet header chamber 26 of a waste heat boiler indicated generally by the reference numeral 27. The inwardly sloping lower portion of the walls of the inlet chamber 26 terminates in an air lock 28 so arranged as to permit removal of dust from the chamber 26 without the admission of air thereto. The waste heat boiler 27 may be of any approved construction. In the embodiment illustrated, the boiler is of the fire tube type, the water and steam chamber being formed by the exterior of the tubes 29, the upper and lower tube sheets and the intermediate inner surface of the walls of the shell. Water may be fed into the space surrounding the tubes through an inlet 30, and steam or hot water withdrawn therefrom through the outlet 31. A suitable pressure regulator is indicated at 31'. The gas outlet header chamber 33 is connected through a gas conduit 34 with a cyclone dust separator 35 supported on framework 36. The separator 35 is comparatively small in size and is made of ordinary sheet iron or steel. Since other features of construction of the separator are well known, further description thereof is unnecessary. Gases from which dust has been removed by the separator leave the system through the outlet pipe 37 to a sulfuric acid or other plant.

The operation of the apparatus described is as follows: Finely divided ore, for example pyrite flotation concentrates, and air or other oxidizing gas are fed into the upper end of the combustion chamber 13 in proper proportions to effect the combustion of the ore. The sulfide ore is substantially completely roasted during its descent through the roasting chamber, and the roasting operation produces cinder constituted chiefly of iron oxide, and sulfur dioxide gases containing appreciable quantities of dust. The details of the roasting process itself form no part of the present invention, and since such operations are known in the art, for example as disclosed in the Cordy et al. patent, further description is unnecessary. The roasting is usually carried out so that the temperature of the gases leaving the roasting chamber through the outlet 24 are not substantially less than 1600° F., and generally in the neighborhood of around 1800° F.

As noted, the gases resulting from the suspension roasting of sulfide ores necessary contain appreciable quantities of dust because of the nature of the operation. Such dust is composed chiefly of fine particles of iron oxide which must be removed from the sulfur dioxide gases before the latter are utilized in the manufacture of sulfuric acid or for other purposes. Heretofore, removal of this dust has been effected in dust chambers immediately following the roasting chamber. Because of high temperatures and the large volume of expanded gases leaving the roasting chamber, the dust chambers have necessarily been large in size and constructed of refractory material. In accordance with the present invention, in order to substantially reduce the cost of equipment and operate the process on a more economical basis, the dust-laden effluent gases of the roasting chamber are first passed through a heat exchange device to rapidly cool the gases, so as to materially reduce the temperature and volume of the gases, and thus permit the use in the gas line of a small dust separator constructed of ordinary sheet iron or steel.

According to the invention, the gases leaving the roasting chamber 13 through the outlet 24, at temperatures generally around 1800° F. are immediately charged into the inlet chamber 26 of the waste heat boiler. The gases thence pass through the tubes 29 of the boiler, and give up large quantities of heat to the water surrounding the tubes. In the waste heat boiler, the hot sulfur dioxide gases are cooled down to temperatures not substantially in excess of 1000° F. and as a rule to about 600–700° F. or lower. The gases cooled to this extend then flow through the pipe connection 34 into the cyclone dust separator 35. It is to be understood that the temperature of the gases should not be reduced in the boiler below the dew point of sulfuric acid to thus avoid condensation of acid and consequent corrosion of the boiler tubes, the dust collector and pipe connections. To this end, it will further be understood that the temperature of the cooling medium in the boiler should preferably be maintained at not less than the dew point of sulfuric acid. The dew point of sulfuric acid in any particular burner gas may, of course, vary with the moisture content of the gas, and moisture content in turn is more or less dependent upon particular operating conditions involved, such as the moisture content of the air fed into the burner to support combustion. For example, assuming that the air employed contains about one-half gram of water per cubic foot, the temperature of the water in the boiler should not be less than approximately 400° F., corresponding to a pressure of about 235 pounds per square inch, to prevent condensation of sulfuric acid.

The degree of heat removed from the gas stream in the waste heat boiler may be controlled either by designing the boiler to meet the conditions usually prevailing in the particular plant, or by adjustment of a pressure regulator such as indicated at 31', or by providing the waste heat boiler with any suitable means for regulating the water level around the tubes. An arrangement of the latter type is particularly advantageous for controlling the temperature of the gases discharged from the waste heat boiler.

Accordingly, it will be seen that by immediately reducing the temperature of the exit gases of the roasting chamber, many advantages are obtained. The heat extracted from the gas may be utilized to generate steam for use in any place about the plant. Because of the reduction in temperature of the gases in the waste heat boiler 27, the volume of gas is greatly reduced, and thus a dust collector of comparatively small size may be employed to effect removal of the dust from the cooled gas stream. Further, on account of the decrease in temperature of the gases from around 1800° F. to about 600° F., the dust collector may be made of ordinary sheet iron or steel, since these materials are comparatively unaffected by sulfur dioxide gases at the lower temperatures noted. If metallic dust collectors were to be used to remove dust from gases at usual temperatures at which they are discharged from the roasting chamber, such apparatus would necessarily have to be made of some expensive material, such as chrome steel, in order to resist the corrosive effects of highly heated sulfur dioxide gases, and additionally, much larger separators would be required to handle the large volume of expanded gases.

The roasting operation itself is, of course, not limited to the utilization of iron pyrites, but contemplates also the treatment of copper pyrites, pyrrhotite, zinc blend and similar ores and flotation concentrates of the same.

We claim:

1. Apparatus for roasting finely divided sulfide ore and producing sulfur dioxide containing gases comprising in combination a roasting chamber having a cinder outlet and a gas outlet, means for forming a suspension of finely divided sulfide ore in an oxidizing gas, means for introducing the suspension into the roasting chamber, whereby the ore is roasted and sulfur dioxide gases and iron oxide cinder are produced, means for separating the sulfur dioxide gases and the bulk of the cinder, a waste heat boiler having the gas inlet thereof communicating with the gas outlet of the roasting chamber, means for passing the sulfur dioxide gases from the roasting chamber through the waste heat boiler whereby the temperature and volume of the sulfur dioxide gases are materially decreased, and a metallic dust collector connected to the gas outlet of the waste heat boiler for separating dust contained in the gases after cooling by passage through the waste heat boiler.

2. Apparatus for roasting finely divided sulfide ore and producing sulfur dioxide containing gases comprising in combination a roasting chamber having a cinder outlet and a gas outlet, means for roasting a suspension of finely divided sulfide ore in the roasting chamber, whereby the ore is roasted and sulfur dioxide gases and iron oxide cinder are produced, means for separating the sulfur dioxide gases and the bulk of the cinder, a waste heat boiler having the gas inlet thereof communicating with the gas outlet of the roasting chamber, means for passing the sulfur dioxide gases from the roasting chamber through the waste heat boiler whereby the temperature and volume of the sulfur dioxide gases are materially decreased, and a metallic dust collector connected to the gas outlet of the waste heat boiler for separating dust contained in the gases after cooling by passage through the waste heat boiler.

3. Apparatus for roasting finely divided sulfide ore and producing sulfur dioxide containing gases comprising in combination a roasting chamber having a cinder outlet and a gas outlet, means for roasting a suspension of finely divided sulfide ore in the roasting chamber, whereby the ore is roasted and sulfur dioxide gases at temperatures not substantially less than 1600° F. and containing dust particles are produced, a metallic dust separator having the inlet thereof connected to the gas outlet of the roasting chamber, said dust collector being adapted to substantially completely remove dust particles from the gaseous products of combustion of the roasting chamber, and a waste heat boiler between the gas outlet of the roasting chamber and the inlet of the dust collector for reducing the temperature of the exit gases of the roasting chamber before entering the dust collector to not substantially more than 700° F., whereby the temperature and volume of the sulfur dioxide gas are materially reduced to permit utilization of a metallic dust collector.

4. Apparatus for roasting finely divided sulfide ore and producing sulfur dioxide containing gases comprising in combination a roasting chamber having a cinder outlet and a gas outlet, means for roasting a suspension of finely divided sulfide ore in the roasting chamber, whereby the ore is roasted and sulfur dioxide gases heated to relatively high temperatures and iron oxide cinder are produced, means for separating the sulfur dioxide gases and the bulk of the cinder, a metallic dust separator having the inlet thereof communicating with the gas outlet of the roasting chamber, said dust collector being adapted to substantially completely remove dust particles contained in the gaseous products of combustion of the roasting chamber, a waste heat boiler interposed between the gas outlet of the roasting chamber and the inlet of the dust collector for reducing the temperature of the exit gases of the roasting chamber before entering the dust collector, whereby the temperature and volume of the sulfur dioxide gas are materially reduced to permit utilization of a metallic dust collector, and means associated with the waste heat boiler for controlling the amount of heat extracted from the sulfur dioxide gases during passage through the waste heat boiler.

BERNARD M. CARTER.
HENRY F. MERRIAM.